United States Patent
Flückiger

[11] Patent Number: 6,086,303
[45] Date of Patent: Jul. 11, 2000

[54] DISTANCE SCREW

[76] Inventor: Werner Flückiger, Kreuzbüntenstrasse 713, CH-5727 Oberkulm, Switzerland

[21] Appl. No.: 09/101,107

[22] PCT Filed: Jul. 24, 1997

[86] PCT No.: PCT/CH96/00025

§ 371 Date: May 10, 1999

§ 102(e) Date: May 10, 1999

[87] PCT Pub. No.: WO97/26460

PCT Pub. Date: Jul. 24, 1997

[51] Int. Cl.[7] .............................. F16B 5/02; F16B 25/00; F16B 35/04

[52] U.S. Cl. ...................... 411/399; 411/412; 411/418; 411/426

[58] Field of Search ................................ 411/399, 411, 411/412, 413, 418, 426, 420

[56] References Cited

U.S. PATENT DOCUMENTS

| | | |
|---|---|---|
| 4,808,051 | 2/1989 | Gietl . |
| 4,959,938 | 10/1990 | De Caro ........................... 411/399 X |
| 5,259,398 | 11/1993 | Vrespa ............................. 411/426 X |
| 5,531,554 | 7/1996 | Jeanson et al. ........................ 411/399 |
| 5,909,992 | 6/1999 | Wu ................................. 411/399 X |

FOREIGN PATENT DOCUMENTS

| | | |
|---|---|---|
| 0319812 | 6/1989 | European Pat. Off. . |
| 3435434 | 4/1986 | Germany . |
| 4228727 | 3/1994 | Germany . |

OTHER PUBLICATIONS

International Search Report, No. PCT/CH96/00025 dated Oct. 1, 1996.

*Primary Examiner*—Neill Wilson
*Attorney, Agent, or Firm*—Brown & Wood, LLP

[57] ABSTRACT

The spacer screw has a first thread section (1) which can be screwed into a base element, a head section (3) which can be introduced into the construction element, a shank section (2) formed between the head section and the first thread section and a recess for the insertion of a tool. A second thread section (4), is additionally formed between the anchoring section and the shank section and has the same core diameter as the anchoring section (6). When using the spacer screw the head section (3) is drawn into the construction element by the second thread section (4) independently of the turning in of the first thread section (1), so that on the one hand the adjustment of the spacing between the base element and the construction element can take place without special measures and, on the other hand, the screw can be used independently of the differences in strength of the base element and the construction element.

9 Claims, 1 Drawing Sheet

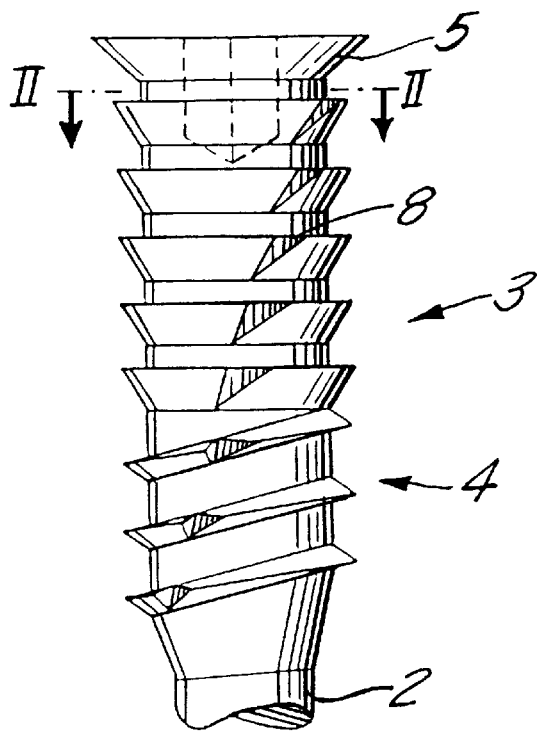
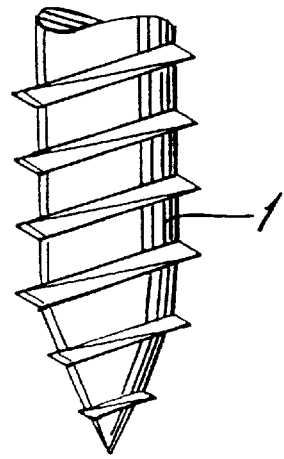
FIG.1
FIG.2
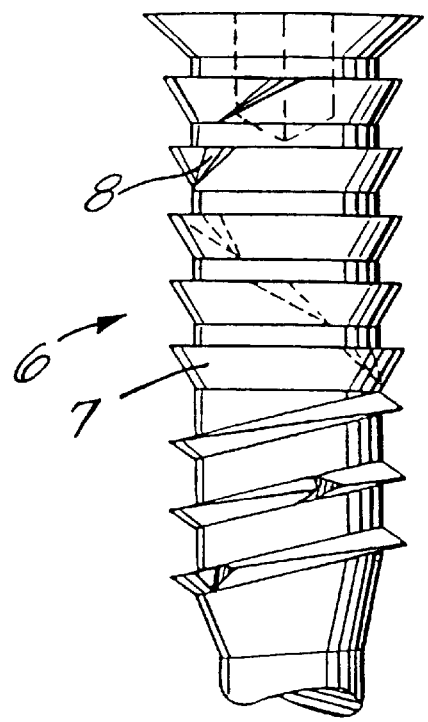
FIG.3

DISTANCE SCREW

BACKGROUND OF THE INVENTION

1. Field of the Invention

The present invention relates to a spacer screw having a first thread section which can be screwed into a base element, a head section with a free screw head-shaped end section an anchoring section having coaxially arranged ring-like projections, a shank section between the head section and the first thread section, and a recess for the insertion of a tool at the end face.

2. Description of the Prior Art

A spacer screw of this kind is known from U.S. Pat. No. 4,808,051. The screw is a countersunk screw with constant core diameter. The screw has a thread section at the front end, an anchoring section and a shank section arranged between them. The anchoring section comprises a plurality of ring-like projections which broaden in the direction towards the screw head. This screw is used to secure a construction element to a base element.

It has proved to be a disadvantage that this screw only has a restricted field of use. On screwing the thread section into the base element the force which has to be applied must be so large that the anchoring section is driven into the construction element. From that it follows that the construction element must always have a lower strength than the base element.

In another known embodiment the spacer screw has a first thread section at the front end, a second thicker thread section at the rear end and a shank section connecting the thread sections.

This screw has the disadvantages that the desired spacing between the base element and the construction element must previously be determined by spacers, because the correction of the spacing means that the screw is turned out of the construction element on being unscrewed because of the same thread pitch of the thread sections, and that the construction element can be pulled off from the thicker thread section as a result of the lack of a screw head, in particular with soft types of wood.

The invention is based on the object of providing a spacer screw which is not subjected to the above-named restrictions.

SUMMARY OF THE INVENTION

The objects of the present invention are achieved by forming a second thread section between the anchoring section and the shank section, with the anchoring section and the second thread section having a larger core diameter than the first thread section.

The advantages which can be achieved by the invention are to be seen in the simplicity of use and in the advantageous price.

BRIEF DESCRIPTION OF THE DRAWINGS

In the following the invention will be explained with reference to the accompanying drawings.

The drawings show:

FIG. 1 a view of an embodiment of a screw in accordance with the invention,

FIG. 2 a section along the line II—II in FIG. 1, and

FIG. 3 a view of a part of another embodiment of the screw of the invention.

DETAILED DESCRIPTION OF THE PREFERRED EMBODIMENT

Reference is made to the FIGS. 1 and 2. The spacer screw contains a first thread section 1 at the front end, a shank section 2 which adjoins the first thread section, a head section 3 at the rear end, a second thread section 4 which is formed between the head section and the shank section and a recess for the insertion of a tool. The thread of the first and second thread sections 1 and 4 has the same pitch.

The head section 3 has a head-like section which is formed as a ring-like projection 5 and an anchoring section 6 with five ring-like projections 7, with the projections 5, 7 being coaxial and spaced apart from one another. The projection 5 is made flush with the end of the screw and has an outer diameter which is larger than the outer diameter of the following five projections 7 in order to achieve a clean termination of the position where it is screwed in. Each projection has a conical cross-section which broadens towards the rear end of the screw starting from the core diameter. This design has the advantage that an action resembling that of a screw head is achieved thereby, which prevents the construction element being pulled off from the screw. The anchoring section 6 and the second thread section 4 have the same core diameter which is larger than the core diameter of the first thread section 1.

The second thread section 4 has three thread turns with the same outer diameter as the projections 7 and is so formed on the anchoring section 6 that the last thread turn ends without transition at the adjoining projection 7. The anchoring section has a length which is approximately twice as long as the second thread section. In this connection it is pointed out that other length ratios can be selected.

When using the screw the second thread section 4 of the invention is screwed into the construction element and the head-like section and the anchoring section 7 is thereby drawn into the construction element. This procedure takes place independently of the screwing of the first thread section 1 into the base element. Through this subdivision of the screw in procedures there arise in particular the following advantages:

that no spacers are required for the securing of the construction element in order to draw the anchoring section into the construction element, but on the contrary the construction element can be held at a distance by hand, and the screw can be used independently of the differences in strength of the base element and of the construction element.

Notches 8 are formed in the projections 7 of the anchoring section 6 and in the thread turns of the second thread section 4 and lie on a straight line. This line extends at an angle of approximately 15° relative to the screw axis. As FIG. 2 shows four rows of notches 8 are provided which are uniformly distributed and arranged with the same alignment at the periphery. The notches 8 are of triangular design, with the apex lying on the core diameter and with one side surface extending radially and the other side surface extending approximately tangentially. The notches 8 can also be arranged along a helical line (FIG. 3).

These notches 8 form cutting edges which, on the one hand, in a particularly advantageous manner facilitate the screwing of the second thread section 4 into the construction element and, on the other hand, bring about a horizontal rotation of the anchoring section relative to the screw axis when a spacing correction is effected, so that the anchoring section cannot emerge from the construction element during the spacing correction.

It is pointed out that the cutting edges of the notches 8 in the projections 7 can be made oppositely directed with respect to the cutting edges in the thread turns of the second thread section 4.

Finally it will be pointed out that the first and second thread sections 1 and 4 can have threads of different types, for example wood threads or particle board threads. Furthermore a ring-like section 7 can be provided instead of the section 5 resembling a screw head.

What is claimed is:

1. Spacer screw having a first thread section (1) which can be screwed into a base element, a head section (3) with a a substantially screw head-shaped end section (5) and an anchoring section (6) having coaxially arranged ring-like projections, a shank section (2) between the head section, and the first thread section, and a recess for the insertion of a tool at an end face, characterized by a second thread section (4) formed between the anchoring section and the shank section, wherein the anchoring section (6) and the second thread section (4) have a larger core diameter than the first thread section (1).

2. Spacer screw in accordance with claim 1, characterized in that in that the anchoring section (6) and the second thread section (4) have substantially the same outer diameter.

3. Spacer screw in accordance with one of the claims 1 or 2, characterized in that the anchoring section (6) and the second thread section (4) have the same core diameter.

4. Spacer screw in accordance with claim 1, characterized by first cutting means (8) which is formed at the anchoring section (6).

5. Spacer screw in accordance with claim 4, characterized by cutting means (8) which is formed at the second thread section (4).

6. Spacer screw in accordance with claim 5 characterized in that the first and second cutting means are formed as notches (8).

7. Spacer screw in accordance with claim 6, characterized in that the notches (8) have a same basic shape.

8. Spacer screw in accordance with claim 6, characterized in that the notches (8) are formed along a line.

9. Spacer screw in accordance with claim 8, characterized in that the line is one of straight and helical.

* * * * *